United States Patent [19]

Ito et al.

[11] Patent Number: 4,704,789
[45] Date of Patent: Nov. 10, 1987

[54] METHOD OF MANUFACTURING ELECTROMAGNETIC MEMBERS

[75] Inventors: Motoya Ito, Katsuta; Noriyoshi Takahashi; Masatoshi Watanabe, both of Hitachi; Toshimi Abukawa, Hitachiota; Takeshi Seya; Hiroshi Kainuma, both of Hitachi; Toshiyuki Syutoo, Ibaraki, all of Japan

[73] Assignees: Hitachi, Ltd.; Hitachi Cable, Ltd., both of Tokyo, Japan

[21] Appl. No.: 832,888

[22] Filed: Feb. 26, 1986

[30] Foreign Application Priority Data

Feb. 27, 1985 [JP] Japan ................... 60-36424

[51] Int. Cl.⁴ .................. H01F 41/02; H01F 7/00
[52] U.S. Cl. ........................ 29/609; 29/598; 29/607; 264/DIG. 58
[58] Field of Search ............ 29/598, 607, 609; 264/DIG. 58

[56] References Cited

U.S. PATENT DOCUMENTS 2,509,012  5/1950  Morrison ............ 264/DIG. 58 X
2,971,106  2/1961  Westphalen .................. 310/166
3,221,196 11/1965  Henry-Baudot .
4,431,979  2/1984  Stijntjes et al. ...... 264/DIG. 58 X

FOREIGN PATENT DOCUMENTS 0472403  3/1929  Fed. Rep. of Germany .
1032545  7/1953  France .
5746656  9/1980  Japan .

OTHER PUBLICATIONS

Patent Abstracts of Japan, JP-A-58-224548, Hitachi, vol. 8, No. 78, 4/10/84.
Patent Abstracts of Japan, JP-A-58-085511, Hitachi, vol. 7, No. 178, 8/6/83.
Patent Abstracts of Japan, JP-A-57-071254, Hitachi, vol. 6, No. 147, 8/6/82.
Patent Abstracts of Japan, JP-A-57-062742, Hitachi, vol. 6, No. 140, 7/29/82.

Primary Examiner—Howard N. Goldberg
Assistant Examiner—Taylor J. Ross
Attorney, Agent, or Firm—Antonelli, Terry & Wands

[57] ABSTRACT

Disclosed is a method of manufacturing an electromagnetic member having properties of magnetic anisotropy as well as electrical conductivity, comprising the steps of coating an outer circumferential surface of each of a plurality of magnetic strips with a first electrically conductive material to a predetermined thickness to thereby form a plurality of composite magnetic strips, binding the plurality of composite magnetic strips, and filling spaces among the plurality of composite magnetic strips in the bundle with a second electrically conductive material substantially the same as the first electrically conductive material. By this method, a mechanically strong electromagnetic member can be obtained in which adjusting the thickness of the first electrically conductive material, the ratio between the magnetic property and the electrically conductive property can be easily adjusted by adjusting the thickness of the first electrically conductive material and blow-holes can be prevented from being generated.

8 Claims, 18 Drawing Figures

FIG. 1
PRIOR ART
FIG. 2
PRIOR ART
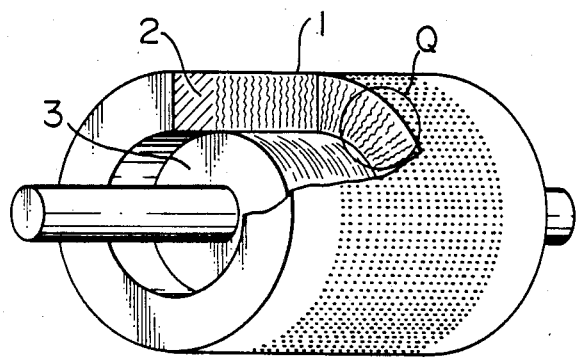
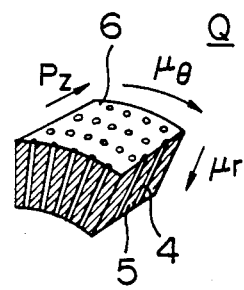
FIG. 3
PRIOR ART
FIG. 4
PRIOR ART
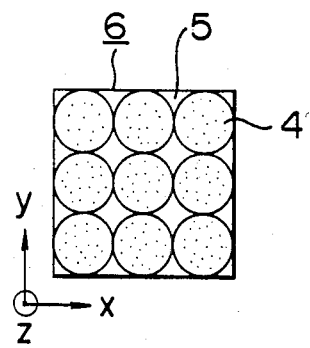
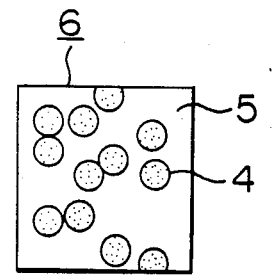

METHOD OF MANUFACTURING ELECTROMAGNETIC MEMBERS

FIELD OF THE INVENTION

The present invention relates to a method of manufacturing electromagnetic members and particularly to method of manufacturing electromagnetic members having properties of magnetic anisotropy as well as electrical conductivity.

BRIEF DESCRIPTION OF THE DRAWINGS

Prior art and preferred embodiment of the present invention will be described hereunder in conjunction with the accompanying drawings, in which:

FIG. 1 is a perspective view partly broken away showing parts of an electric machine in the prior art;

FIG. 2 is an enlarged perspective view showing a part encircled by a circle Q in FIG. 1;

FIGS. 3 and 4 are views in plan showing electromagnetic members produced by the conventional manufacturing method;

FIG. 6 is a perspective view partly broken away showing a composite magnetic strip and FIG. 7 is a perspective view showing a plurality of bound composite magnetic strips;

BACKGROUND OF THE INVENTION

Figure 5:
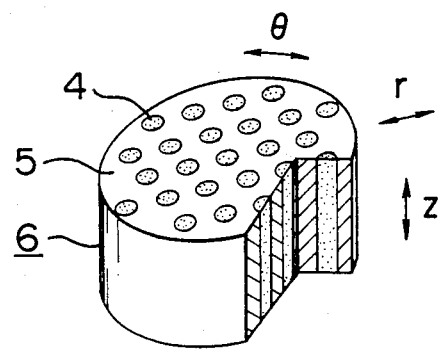
FIG. 5. is a perspective view partly broken away showing an electromagnetic member produced by a first embodiment of the manufacturing method of the present invention.

Generally, there are provided magnetic members and current conduction members in principal portions in electric machines or apparatuses, and it is known to constitute the principal portions by magentically anisotropic and electrically conductive materials which have properties of magnetic anisotropy as well as electrical conductivity. For example, such magnetically anisotropic and electrically conductive materials are often employed for dampers of rotary machines or apparatuses, for secondary conductors or magnetic shielding plates of linear motors, and so on.

FIGS. 1 and 2 show a specific example, as disclosed in Japanese Patent Unexamined Publication No. 46656/82, in which a rotor 1 of an induction motor has a double cylinder structure constituted by an outer sheath 2 and an iron core 3 and a magnetically anisotropic and electrically conductive member 6 is used to constitute the outer sheath 2. Owing to such an arrangement, a high efficient motor can be produced. The magnetically anisotropic and electrically conductive member 6 constituting the outer sheath 2 has radial magnetic permeability ($\mu_r$) which is larger than circumferential magnetic permeability ($\mu_\theta$). Particularly, the member 6 is molded in such a manner that a plurality of radially elongated magnetic wires or strips 4 are arranged radially as shown in FIG. 2 and an electrically conductive material 5 such as copper, aluminum, or the like, is poured in spaces among the magnetic strips 4.

Such electromegnetically acting molded parts are required to have a predetermined electromagnetic characteristic and to be formed by a homogeneous and strong material. In the case where a plurality of magnetic strips of such as iron are arranged and an electrically conductive material 5 such as copper, aluminum, or the like, is poured in spaces among the magnetic strips, the electromagnetic characteristic may vary depending on the ratio between and arrangement of the iron and the copper or aluminum. However, it is very difficult to adjust the above-mentioned ratio and the homogeneity in the arrangement, and further iron has poor affinity with copper or aluminum, so that there has been a disadvantage that blowholes which are spaces of foams are often generated in casting to cause clearances at contacting portions between the iron and the copper or the aluminum to thereby prevent complete contact from being made at the contacting portions.

Further, in the conventional method, it is difficult to produce a homogeneous molded member having a predetermined electromagnetic property in the case where a plurality of iron wires are bound and copper is poured within the bound wires.

FIGS. 3 and 4 are views in plan respectively showing electromagnetic members produced by the conventional manufacturing method.

In FIG. 3, if a plurality of iron wires used as magnetic strips 4 are densely bound and copper which is an electrically conductive material 5 is poured into spaces in the bundle, the electrically conductive material 5 in each space can not be separated from but contacted by those in other spaces, even if the pouring has been well performed. In this case, the ratio of area between the iron and copper is generally determined and can not be freely adjusted even if the diameter of the iron wires is changed. Accordingly, each of the respective values of the magnetic permeability $\mu_z$, $\mu_x$, and $\mu_y$ and the resistivity $\rho_z$, $\rho_x$, and $\rho_y$ in the directions z, x and y in FIG. 3 shows a substantially fixed value. In electromagnetic design, it is desirable to give various constituent members individually proper permeability and/or conductivity and to this end it is necessary to vary the sectional area of each of the iron and the copper and/or the ratio of area between the iron and copper. In this regard, there is a difficulty in the method in which copper is poured in a bundle of iron wires. Although there may be proposed an idea that the iron wires are loosely bound to increase the copper portion in order to eliminate the above-mentioned difficulty, there is another difficulty that the positions of the iron wires may move in pouring of copper so as to provide a distribution in which the iron wires are made one-sided as shown in FIG. 4 so that it is impossible to obtain an electromagnetically homogeneous molded member.

SUMMARY OF THE INVENTION

A main object of the present invention is to provide a method of manufacturing a mechanically strong electromagnetic member in which the ratio between the magnetic property and the electric conductive property can be easily adjusted.

Another object of the present invention is to provide a method of manufacturing an electromagnetic member which has magnetically anisotropic and electrically conductive properties and which has any desired shape, such as a circular one, a rectangular one, or the like, in cross-section.

To attain the above objects, in the method according to the present invention, each of magnetic strips is coated on its outer circumferential surface with an electrically conductive material to be formed into an integrated composite magnetic strip constituting a magnetic body coated with an electrically conductive material, a predetermined number of the thus formed composite magnetic strips are arranged, and an electrically conductive material having substantially the same characteristics as those of the conductive material used for the outer coating of the respective composite magnetic strips is filled in the spaces among the composite magnetic strips.

According to this method of manufacturing an electromagnetic member, since each of the composite magnetic strips is prepared in advance such that a magnetic strip is covered at its outer circumferential surface with an electrically conductive material, it is possible to easily adjust the ratio between the magnetic property and the electrically conductive property of the electromagnetic member by adjusting in advance the thickness of the coating of the elctrically conductive material, and in addition, since the electrically conductive material used for the outer coating of the respective composite strips is selected to be of the kind the same as or similar to the material used to be poured, both the electrically conductive materials have a good affinity with each other so that there occurs no separation therebetween in pouring, the pouring can be performed rapidly, and the generation of blow-holes can be sufficiently prevented so as to make the products strong mechanically.

DESCRIPTION OF THE PREFERRED EMBODIMENT

Referring to the drawings, preferred embodiments of the present invention will be described hereunder.

As an embodiment according to the present invention, a method of manufacturing an electromagnetic member formed as a flat rotor of an electric motor as shown in FIG. 5 will be described. First, an outline of this rotor is explained by using the three directional components r, z and θ in FIG. 5. A plurality of magnetic strips 4 each consisting of iron wire extending in the x-direction and an electrically conductive material 5 made of copper extending in the z-direction and filled in the spaces among the iron wires so as to closely contact with the iron wires integrally constitute a disk-like magnetically-anisotropic electrically-conductive body or electromegnetic member 6. That is, the electromagnetic member 6 has magnetic anisotropy such that the magnetic permeability $\mu_z$ in the z-direction along which the iron wires of the magnetic strips 4 extending is larger than both the magnetic permeabilities $\mu_r$ and $\mu_\theta$ in the r- and θ- direction each intersecting the z-direction. In spite of the fact that each of copper and iron is electrically conductive and therefore both the magnetic strips 4 and the electrically conductive material 5 are electrically conductive, the integrated electromagnetic member 6 is magnetically anisotropic. Further, paying attention onto the plane (r, θ), a plurality of iron wires of the magnetic strips 4 having a circular cross-section are regularly arranged at predetermined intervals and the iron wires parallelly extend in the z-direction so that the thus integrally constituted electromagnetic member 6 is generally homogeneous. It is of course that the outer circumference of each iron wire is surrounded by copper of the electrically conductive material 5.

A rotor in which such an electromagnetic member 6 is employed and disposed in opposition to a stator forming a rotary magnetic field with a gap in the z-direction therebetween, shows magnetically the same performance as a rotor having wire-windings and electrically the same performance as a rotor having copper windings. For example, if such a rotor employing such an electromagnetic member 6 is used, it is possible to obtain an electric motor more superior in performance when compared with a squirrel-cage rotor of an induction motor or a magnetically isotropic solid rotor.

Figure 6:
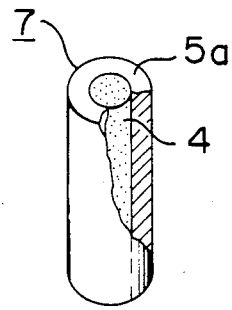
FIGS. 6 and 7 are views showing processes of the manufacturing method according to the present invention, in which, particularly.
Figure 7:
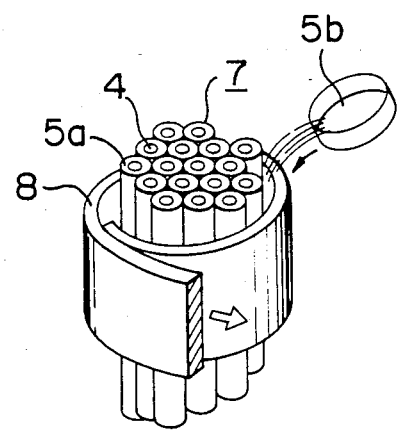

Next, description will be made as to a method of manufacturing such an electromagnetic member which is a main object of the present invention. FIGS. 6 and 7 illustrate the steps of the method.

First, as shown in FIG. 6, the outer circumference of each iron wire of the magnetic strips 4 is integrally coated with copper of a first electrically conductive material 5a so as to form a composite magnetic strip 7. The integration of the iron and copper can be performed through cold rolling in good condition so that the iron and copper are completely metalically coupled with each other. It is desirable the composite magnetic strip is made to be able to be worked as a unit member. Next, as shown in FIG. 7, each of the thus formed composite magnetic strips 7 are cut to a suitable length and a selected number of the cut composite magnetic strips are gathered and bound in a frame 8 which is used to clamp the bundle of composite magnetic strips 7. Pressure is applied onto the frame 8, which is made of copper in this embodiment, to pull its end in the direction of arrow as shown in FIG. 7 to thereby strongly clamp the bundle of composite magnetic strips 7. Then the thus bound composite magnetic strips are preheated to a suitable temperature if necessary and a second electrically conductive material 5b, which is molten copper in this embodiment, of high temperature is poured into the spaces formed between the frame 8 and the composite magnetic strips 7 and among the composite magnetic strips 7. After cooled, the bundle is suitably worked or cut to a predetermined dimension size to thereby obtain a desired electromagnetic member 5 as shown in FIG. 5.

As described above, in this embodiment, each of iron wires is coated in advance with copper to a predetermined thickness and then copper is poured in the spaces among the iron wires coated with copper, so that there is a good affinity between the coating copper and the poured copper so as to prevent separation from occurring therebetween and pouring or casting can be rapidly performed without generation of blow-holes to thereby obtain an electromagnetic member consisting of a mechanically-strong, magnetically anisotropic, and electrically conductive body.

Figure 8:
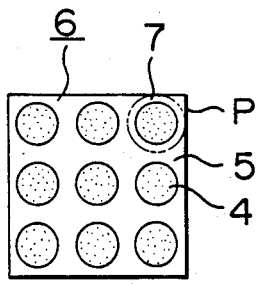
FIGS. 8 and 9 are views in plan respectively showing electromagnetic members produced by the manufacturing method according to the present invention.
Figure 9:
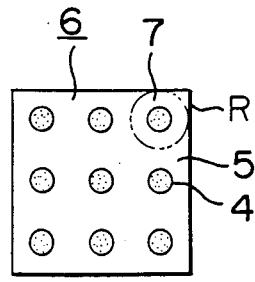

FIGS. 8 and 9 are plan views each showing an electromagnetic member produced by this embodiment of the manufacturing method according to the present invention.

Figure 10:
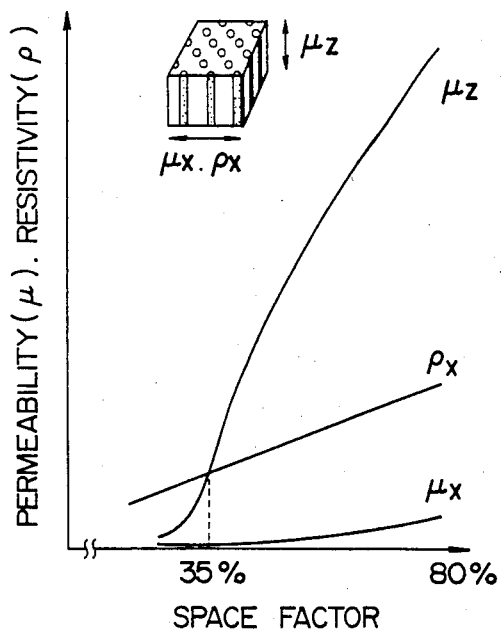
FIG. 10 is a graph showing relationship of the space factor of iron versus the magnetic permeability and the resistivity for explaining the present invention.

According to this embodiment of the present invention, the composite magnetic strips 7 which are obtained by coating the respective outer circumferences of the iron wires of the magnetic strips 4 are employed and therefore it is possible to produce such an electromagnetic member as shown in FIG. 8 which has a proper area ratio and has homogeneous magnetic anisotropy as well as electrical conductivity by properly selecting in advance the diameter of each of the iron wires and the thickness of the copper coating of the same and merely by pouring copper into the spaces among the simply bound composite magnetic strips 7. That is, the copper coating portion of the composite magnetic strip 7 is selected to be relatively thin in the case of FIG. 8 as shown by a two-dotted chain line P so that the ratio of copper to iron in the resultant electromagnetic member is small, while in the electromagnetic member in the case of FIG. 9 the copper coating portion of the composite magnetic strip 7 is selected to be thicker than the former case as shown by a two-dotted chain line R so that the ratio of copper to iron is larger. AS the result of experiments, it was found that the relationship of the space factor of iron versus the electromagnetic characteristics had such a tendency as shown in FIG. 10. In FIG. 10 in which $\mu_z$ and $\mu_x$ represent the magnetic permeabilities in the z- and x-direction respedtively and $\rho_x$ represents the resistivity in the x-direction, as the space factor of iron increases each of $\mu_z$, $\mu_x$, and $\rho_x$ increases, of which the increase of $\mu_z$ is remarkable.

Further, according to this embodiment, the frame 8 made of copper is used, so that there is a good affinity also between the frame 8 and the poured copper and the casting can be rapidly performed also at this portion without generation of blow-holes. If the frame 8 is placed in the vicinity of the outer circumstance of a block composite magnetic strips 7 but with a space there between, the produced electromagnetic member 6 has a copper portion positioned at its outer circumference as shown in FIG. 5 so that the member 6 has a uniform side surface and so as to be easily handled.

Figure 11:
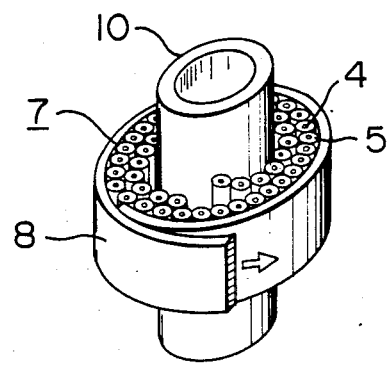
FIG. 11 is a perspective view showing a process of production for explaining a second embodiment of the manufacturing method according to the present invention.
Figure 12:
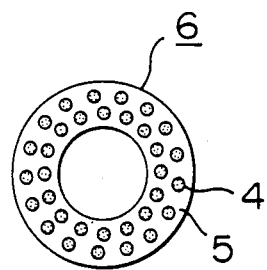
FIG. 12 is a plan view showing an electromagnetic member produced by the manufacturing method illustrated in FIG. 11.

FIGS. 11 through 14 show other embodiments of the present invention and illustrate various manners how to bind a plurality of composite magnetic strips in the case where various shapes of electromagnetic members different from that of FIG. 5. FIGS. 11 and 12 show an embodiment in which a ring-like electromagnetic member having a central through hole as shown in FIG. 12 is produced. A plurality of composite magnetic strips 7 are arranged within a frame 8 and around a copper pipe 10 having a diameter equal to the desired inner diameter of electromagnetic member to be produced and a pressure is exerted onto the frame 8 to pull its end in the direction of arrow as shown in FIG. 11.

Figure 13:
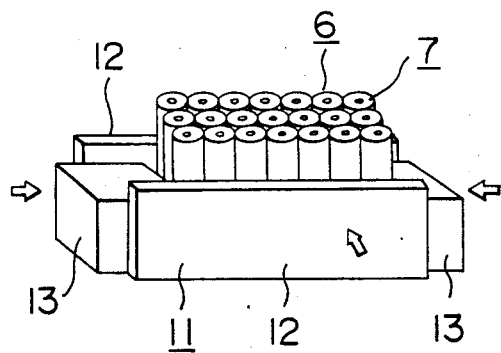
FIGS. 13 and 14 are perspective views respectively showing processes of production for explaining a third and a fourth embodiment of the manufacturing method according to the present invention.

FIG. 13 shows another embodiment for manufacuring an electromagnetic member in the form of a rectangular prism, in which two copper plates 12 and two copper blocks 13 form a rectangular frame 11 and pressure is exerted onto this frame 11 from its four sides in the directions of arrows as shown in the drawing so as to bind a plurality of composite magnetic strips 7.

Figure 14:
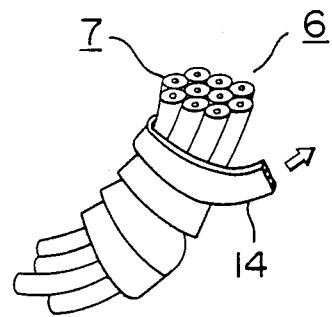

FIG. 14 shows still another embodiment for manufacturing a rod-like electromagnetic member having a desired curvature, in which a belt-like frame 14 is employed and pressure is exerted onto the frame 14 to pull its end in the direction of arrow as shown in the drawing to thereby bind a plurality of composite magnetic strips 7. The thus produced electromagnetic member 6 has such anisotropy that the magnetic permeability along the longitudinal direction of the composite magnetic strips is larger than that in any other direction.

Figure 15:
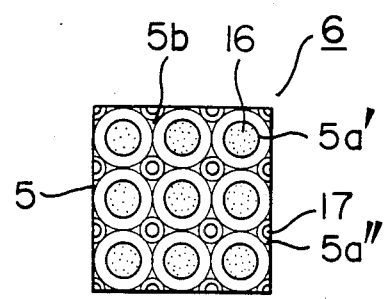
FIG. 15 is a plan view showing another electromagnetic member produced by the manufacturing method according to the present invention.

FIG. 15 shows a further embodiment in which a first and a second group of composite magnetic strips 16 and 17 different in diameter from each other as seen in the drawing to improve the space factor of iron. The second plurality of the composite magnetic strips 17 each coated at its outer circumference with copper of an electrically conductive material $5a'$ and each having a small diameter is inserted in the spaces among the first plurality of the composite magnetic strips 16 each coated at its outer circumference with copper of an electrically conductive material $5a''$ and each having a diameter larger than that of the former. In this arrangement, the total area of the spaces among the composite magnetic strips 16 and 17 can be reduced and therefore the region into which a second electrically conductive material 5b is to be poured can be narrowed.

Although a frame (8, 11, 12, 14) made of copper is employed in each of the embodiments described above, and although copper is optimum as a material for the frame, a frame made of aluminum or steel may be employed. In this case, however, the affinity between the frame and the poured copper becomes poor and therefore it is desirable to cut away the frame after pouring. Further, alternatively, a previously prepared mold may be employed so that a plurality of composite magnetic strips 7 are crammed into the frame.

Figure 16:
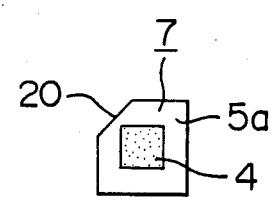
FIGS. 16 and 17 are plan views each showing a composite magnetic strip according to the present invention.
Figure 17:
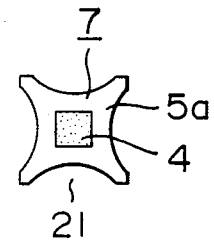

FIGS. 16 and 17 are views in cross-section showing various composite magnetic strips 7 which are different from those employed in the previous embodiments. It is not always necessary that the composite magnetic strip has a circular cross-section as shown in FIG. 6, but the composite magnetic strip may have a rectangular cross-section. Such composite magnetic strips each having a rectangular cross-section may be conveniently used in the case where an electromagnetic member in the form of a rectangular prism is produced. In this case, it is desirable that the composite magnetic strip is provided with a partly cut-away portion 20 as shown in FIG. 16 or concave portions 21 as shown in FIG. 17, in order to assure passages of molten copper.

Figure 18:
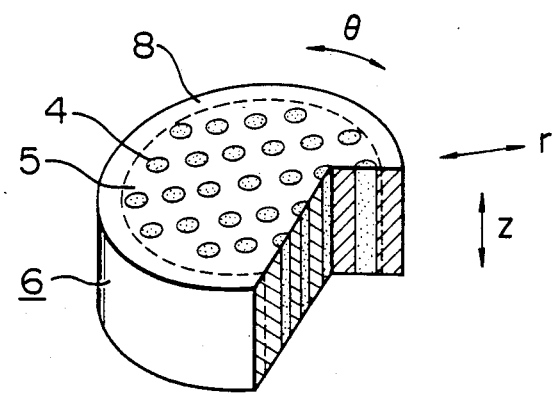
FIG. 18 is a perspective view partly broken away showing an electromagnetic member produced by making an improvement on that of the first embodiment shown in FIG. 5.

In the case where each of the frame 8 and the second electrically conductive material 5b is of copper, it is not always necessary to cut away the frame 8 after pouring the second electrically conductive material 5b. FIG. 18 is a perspective view partly broken away showing an electromagnetic member 6 produced by making an improvement on that of the first embodiment shown in FIG. 5. In the electromagnetic member 6 in FIG. 18, both the frame 8 and the second electrically conductive material 5b are of copper and the frame 8 is left as it is even after pouring the second electrically conductive material 5b as shown in the drawing, unlike the foregoing embodiments of FIGS. 7, 11, 13, and 14 in each of which the frame 8 is cut away after pouring of the second electrically conductive material 5b.

As discussed above, according to the present invention, the following remarkable effects can be obtained:

(1) It is possible to obtain a homogeneous and mechanically strong electromagnetic member having magnetic and electrically-conductive properties which are selectable desiredly;

(2) It is possible to produce a magnetically-anisotropic and electrically-conductive electromagnetic member having a desired cross-section such as a circular one, a rectangular one, or the like; and (3) It is possible to prevent separation from occuring in contacting portions between the composite magnetic strips and the casting and to prevent blow-holes from being generated, because the first electrically conductive material for the outer circumferential coating portion of each of the composite magnetic strips is selected to be of the kind the same as or closely similar to the second electrically conductive material used to be poured.

We claim:

1. A method of manufacturing an electromagnetic member by filling spaces among a plurality of parallelly arranged magnetic strips with an electrically conductive material, comprising the steps of:
   a. coating an outer circumferential surface of each of said plurality of magnetic strips with a first electrically conductive material to a predetermined thickness to thereby form a plurality of composite magnetic strips;
   b. binding said plurality of composite magnetic strips into a bundle and fixedly holding said bundle; and
   c. filling spaces among said plurality of composite magnetic strips in the bundle with a second electrically conductive material, in which said second electrically conductive material is of the same kind as said first electrically conductive material.

2. A method of manufacturing an electromagnetic member according to claim 1, in which both of said first electrically conductive material, and said second electrically conductive material are copper.

3. A method of manufacturing an electromagnetic member by filling spaces among a plurality of parallelly arranged magnetic strips with an electrically conductive material, comprising the steps of:
   a. coating an outer circumferential surface of each of said plurality of magnetic strips with a first electrically conductive material to a predetermined thickness to thereby form a plurality of composite magnetic strips in which the coating is performed through cold rolling;
   b. binding said plurality of composite magnetic strips into a bundle and fixedly holding said bundle; and
   c. filling spaces among said plurality of composite magnetic strips in the bundle with a second electrically conductive material.

4. A method of manufacturing an electromagnetic member by filling spaces among a plurality of parallelly arranged magnetic strips with an electrically conductive material, comprising the steps of:
   a. coating an outer circumferential surface of each of said plurality of magnetic strips with a first electrically conductive material to a predetermined thickness to thereby form a plurality of composite magnetic strips, in which said plurality of composite magnetic strips are arranged around a copper pipe to produce said electromagnetic member in the form of a doughnut;
   b. binding said plurality of composite magnetic strips into a bundle and fixedly holding said bundle; and
   c. filling spaces among said plurality of composite magnetic strips in the bundle with a second electrically conductive material.

5. A method of manufacturing an electromagnetic member by filling spaces among a plurality of parallelly arranged magnetic strips with an electrically conductive material, comprising the steps of:
   a. coating an outer circumferential surface of each of said plurality of magnetic strips with a first electrically conductive material to a predetermined thickness to thereby form a plurality of composite magnetic strips;
   b. binding said plurality of composite magnetic strips into a bundle and fixedly holding said bundle, in which the bundle of said plurality of composite magnetic strips are surrounded at four sides by a frame to produce said electromagnetic member in a form of a rectangular prism; and
   c. filling spaces among said plurality of composite magnetic strips in the bundle with a second electricaly conductive material.

6. A method of manufacturing an electromagnetic member by filling spaces among a plurality of parallelly arranged magnetic strips with an electrically conductive material, comprising the steps of:
   a. coating an outer circumferential surface of each of said plurality of magnetic strips with a first electrically conductive material to a predetermined thickness to thereby form a plurality of composite magnetic strtips;
   b. binding said plurality of composite magnetic strips into a bundle and fixedly holding said bundle, in which the bundle of said plurality of composite magnetic strips are surrounded by a belt-like frame to produce said electromagnetic member in a form of a rod having a given curvature; and
   c. filling spaces among said plurality of composite magnetic strips in the bundle with a second electrically conductive material.

7. A method of manufacturing an electromagnetic member by filling spaces among a plurality of parallelly arranged magnetic strips with an electrically conductive material, comprising the steps of:
   a. coating an outer circumferential surface of each of said plurality of magnetic strips with a first electrically conductive material to a predetermined thickness to thereby form a plurality of composite magnetic strips;
   b. binding said plurality of composite magnetic strips into a bundle;
   c. arranging a frame of an electrically conductive material for clamping the bundle of said plurality of composite magnetic strips at an outer circumference of said bundle and clamping said plurality of composite magnetic strips; and
   d. filling spaces among said clamped plurality of composite magnetic strips with a second electrically conductive material.

8. A method of manufacturing an electromagnetic member by filling spaces among a plurality of parallelly arranged amgnetic strips with an electrically conductive material, comprising the steps of:
   a. coating an outer circumferential surface of each of said plurality of magnetic strips with a first electrically conductive material to a predetermined thickness to thereby form a plurality of composite magnetic strips;
b. binding said plurality of composite magnetic strips into a bundle;
c. arranging a frame of an electrically conductive material for clamping the bundle of said plurality of composite magnetic strips at an outer circumference of said bundle and clamping said plurality of composite magnetic strips;
d. filling spaces among said clamped plurality of composite magnetic strips with a second electrically conductive material;
e. cooling said second electrically conductive material and said composite magnetic strips; and
f. removing said frame.

* * * * *